(12) United States Patent
Sennoun et al.

(10) Patent No.: US 10,830,540 B2
(45) Date of Patent: Nov. 10, 2020

(54) ADDITIVELY MANUFACTURED HEAT EXCHANGER

(71) Applicant: General Electric Company, Schenectady, NY (US)

(72) Inventors: Mohammed El Hacin Sennoun, West Chester, OH (US); James Fitzgerald Bonar, Cincinnati, OH (US); Rachel Wyn Levine, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/677,004

(22) Filed: Nov. 7, 2019

(65) Prior Publication Data
US 2020/0072559 A1    Mar. 5, 2020

Related U.S. Application Data

(63) Continuation of application No. 16/207,038, filed on Nov. 30, 2018, now Pat. No. 10,502,502, which is a
(Continued)

(51) Int. Cl.
*F28F 1/40* (2006.01)
*F28F 7/02* (2006.01)
(Continued)

(52) U.S. Cl.
CPC ............. *F28F 1/40* (2013.01); *F28C 3/04* (2013.01); *F28D 1/05391* (2013.01); *F28F 7/02* (2013.01);
(Continued)

(58) Field of Classification Search
CPC ........ F28F 1/40; F28F 7/02; F28F 1/34; F28F 3/048; F28F 1/10; F28F 1/12; F28F 1/24;
(Continued)

(56) References Cited

U.S. PATENT DOCUMENTS 1,963,906 A    6/1934   Jaffe
2,181,927 A   12/1939   Townsend
(Continued)

FOREIGN PATENT DOCUMENTS

CN    105258159 A    1/2016
EP      3012436 A1   4/2016
(Continued)

OTHER PUBLICATIONS

Eurasian Patent Office Search Report Corresponding to App 201892399 dated Jun. 13, 2019, Moscow Russia, 2 pages.
(Continued)

*Primary Examiner* — Justin M Jonaitis
(74) *Attorney, Agent, or Firm* — Dority & Manning, P.A.

(57) ABSTRACT

A heat exchanger and a method for additively manufacturing the heat exchanger are provided. The heat exchanger includes a plurality of fluid passageways that are formed by additive manufacturing methods which enable the formation of fluid passageways that are smaller in size, that have thinner walls, and that have complex and intricate heat exchanger features that were not possible using prior manufacturing methods. For example, the fluid passageways may be curvilinear and may include heat exchanging fins that are less than 0.01 inches thick and formed at a fin density of more than four heat exchanging fins per centimeter. In addition, the heat exchanging fins may be angled with respect to the walls of the fluid passageways and adjacent fins may be offset relative to each other.

20 Claims, 7 Drawing Sheets

Related U.S. Application Data continuation of application No. 15/444,566, filed on Feb. 28, 2017, now Pat. No. 10,175,003.

(51) Int. Cl.

| | |
|---|---|
| *F28D 1/053* | (2006.01) |
| *F28C 3/04* | (2006.01) |
| *F28F 3/04* | (2006.01) |
| *F28D 1/03* | (2006.01) |
| *F28D 7/00* | (2006.01) |
| *F28F 1/34* | (2006.01) |
| *F28D 21/00* | (2006.01) |
| *F28D 1/02* | (2006.01) |

(52) U.S. Cl.
CPC ............ *F28D 1/035* (2013.01); *F28D 1/0383* (2013.01); *F28D 7/005* (2013.01); *F28D 2001/0273* (2013.01); *F28D 2021/0026* (2013.01); *F28D 2021/0089* (2013.01); *F28F 1/34* (2013.01); *F28F 3/048* (2013.01)

(58) Field of Classification Search
CPC ..... F28F 1/32; F28F 3/005; F28F 3/08; F28C 3/04; F28D 1/05391; F28D 1/035; F28D 1/0383; F28D 7/005; F28D 2001/0273; F28D 2021/0026; F28D 2021/0089; F28D 1/04; F28D 7/00; F28D 9/00; B60H 1/02; B60H 1/04; B60H 1/16; B61D 27/00
USPC ..... 165/51, 148, 151, 41, 42, 164, 165, 166, 165/167
See application file for complete search history.

(56) References Cited

U.S. PATENT DOCUMENTS

| | | | |
|---|---|---|---|
| 2,343,542 A | 3/1944 | Faunce | |
| 2,872,165 A | 2/1959 | Wennerberg | |
| 2,939,686 A | 6/1960 | Wildermuth | |
| 3,072,225 A | 1/1963 | Cremer et al. | |
| 3,334,399 A * | 8/1967 | Teeguarden | .......... F28D 9/0075 |
| | | | 29/890.039 |
| 3,643,733 A | 2/1972 | Hall et al. | |
| 3,757,855 A | 9/1973 | Kun et al. | |
| 3,807,496 A | 4/1974 | Stadmark | |
| 4,109,710 A | 8/1978 | Forster et al. | |
| 4,211,208 A | 7/1980 | Lindner | |
| 4,216,937 A | 8/1980 | Bridgnell et al. | |
| 4,253,520 A | 3/1981 | Friedericy et al. | |
| 4,470,455 A | 9/1984 | Sacca | |
| 4,503,908 A | 3/1985 | Rosman et al. | |
| 4,596,285 A | 6/1986 | Dinulescu | |
| 4,676,303 A | 6/1987 | Barroyer et al. | |
| 5,251,692 A | 10/1993 | Haussmann | |
| 5,695,007 A | 12/1997 | Fauconnier et al. | |
| 5,810,077 A | 9/1998 | Nakamura et al. | |
| 5,987,877 A | 11/1999 | Steiner | |
| 7,185,483 B2 | 3/2007 | Czachor | |
| 7,575,793 B2 | 8/2009 | Aniolek et al. | |
| 7,866,377 B2 | 1/2011 | Slaughter | |
| 8,522,521 B2 | 9/2013 | Dyer | |
| 9,835,380 B2 | 12/2017 | Kupiszewski et al. | |
| 1,017,500 A1 | 1/2019 | Sennoun et al. | |
| 2007/0240865 A1 | 10/2007 | Zhang et al. | |
| 2008/0014528 A1 | 1/2008 | Bailey et al. | |
| 2008/0149313 A1 * | 6/2008 | Slaughter | .............. B22F 3/1055 |
| | | | 165/148 |
| 2010/0012289 A1 | 1/2010 | Haussmann | |
| 2010/0239793 A1 | 9/2010 | Andrews et al. | |
| 2011/0056652 A1 | 3/2011 | Neher et al. | |
| 2012/0074150 A1 | 3/2012 | Wortmann et al. | |
| 2012/0141851 A1 | 6/2012 | Hou et al. | |
| 2012/0279242 A1 | 11/2012 | Seybold et al. | |
| 2013/0075054 A1 | 3/2013 | Fox et al. | |
| 2013/0140010 A1 | 6/2013 | Parfenov | |
| 2013/0152989 A1 | 6/2013 | Krinn et al. | |
| 2013/0236299 A1 * | 9/2013 | Kington | ..................... F02C 7/10 |
| | | | 415/177 |
| 2014/0034028 A1 | 2/2014 | Zhang et al. | |
| 2014/0116664 A1 | 5/2014 | Landre | |
| 2014/0154548 A1 | 6/2014 | Dillmann et al. | |
| 2014/0166236 A1 | 6/2014 | Tan et al. | |
| 2014/0328964 A1 * | 11/2014 | Mark | ....................... B29C 70/20 |
| | | | 425/166 |
| 2014/0360698 A1 | 12/2014 | Waldman et al. | |
| 2015/0027669 A1 * | 1/2015 | Kokas | ................. F28D 15/0275 |
| | | | 165/104.26 |
| 2015/0053380 A1 | 2/2015 | Army, Jr. et al. | |
| 2015/0114611 A1 | 4/2015 | Morris et al. | |
| 2015/0129184 A1 | 5/2015 | Alhazmy | |
| 2015/0168080 A1 | 6/2015 | Honma et al. | |
| 2015/0176924 A1 | 6/2015 | Hu et al. | |
| 2015/0192370 A1 | 7/2015 | Suzuki et al. | |
| 2015/0241142 A1 | 8/2015 | Vallee et al. | |
| 2015/0377562 A1 | 12/2015 | Buckrell et al. | |
| 2016/0010863 A1 | 1/2016 | Ott et al. | |
| 2016/0108814 A1 | 4/2016 | Schmitz | |
| 2016/0108815 A1 | 4/2016 | Schmitz et al. | |
| 2016/0109130 A1 | 4/2016 | Stastny et al. | |
| 2016/0116218 A1 | 4/2016 | Shedd et al. | |
| 2016/0116222 A1 * | 4/2016 | Shedd | ..................... G06F 1/206 |
| | | | 165/166 |
| 2016/0131432 A1 * | 5/2016 | Neumann | .............. F28D 9/0093 |
| | | | 165/166 |
| 2016/0151860 A1 | 6/2016 | Engeli et al. | |
| 2016/0175934 A1 | 6/2016 | Lacy et al. | |
| 2016/0201998 A1 | 7/2016 | Kennedy et al. | |
| 2016/0202003 A1 | 7/2016 | Gerstler et al. | |
| 2016/0230595 A1 * | 8/2016 | Wong | ........................ F28F 3/02 |
| 2016/0265850 A1 * | 9/2016 | Kupiszewski | ........ F28D 1/0233 |
| 2016/0305713 A1 | 10/2016 | Grande Fernandez et al. | |
| 2016/0363387 A1 | 12/2016 | Stapleton | |
| 2017/0205149 A1 | 7/2017 | Herring et al. | |
| 2018/0244127 A1 | 8/2018 | Sennoun et al. | |

FOREIGN PATENT DOCUMENTS

| | | |
|---|---|---|
| EP | 3062186 A1 | 8/2016 |
| JP | 20010141674 A | 2/2001 |
| RU | 2535187 C1 | 12/2014 |

OTHER PUBLICATIONS

GE Co-Pending U.S. Appl. No. 15/821,729, filed Nov. 22, 2017.
PCT ISR Corresponding to PCT/US2018/018764 dated Jun. 19, 2018.
Chinese Office Action Corresponding to Application No. 201880028004 dated Sep. 17, 2020.

* cited by examiner

ADDITIVELY MANUFACTURED HEAT EXCHANGER

CROSS-REFERENCE TO RELATED APPLICATION

This application is a continuation of U.S. application Ser. No. 16/207,038, filed on Nov. 30, 2018, titled "ADDITIVELY MANUFACTURED HEAT EXCHANGER," which is a continuation of U.S. application Ser. No. 15/444,566, filed on Feb. 28, 2017, titled "ADDITIVELY MANUFACTURED HEAT EXCHANGER," both of which are hereby expressly incorporated herein by reference in its entirety.

FIELD

The present subject matter relates generally to heat exchangers, and more particularly, to additively manufactured heat exchangers.

BACKGROUND

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bar, foils, fins, manifolds, etc. Each of these parts must be individually positioned, oriented, and connected to the supporting structure, e.g., via brazing, welding, or another joining method. Thus, for example, one particular heat exchanger for a gas turbine engine includes 250 parts that must be assembled into a single, fluid-tight component. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanging features that may be included in the heat exchanger, e.g., within the fluid passageways.

Accordingly, a gas turbine engine with an improved heat exchanger would be useful. More specifically, a heat exchanger for a gas turbine engine that is easier to manufacture and includes heat exchanging features for improved performance would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a heat exchanger is provided. The heat exchanger includes a first passageway housing defining a first fluid passageway. A first plurality of heat exchanging features are positioned within the first fluid passageway, each of the first plurality of heat exchanging features defining a first thickness and a first feature density. A second passageway housing defines a second fluid passageway in thermal communication with the first fluid passageway, the first passageway housing and the second passageway housing being additively manufactured as a single, integral piece. A second plurality of heat exchanging features are positioned within the second fluid passageway, each the second plurality of heat exchanging features defining a second thickness and a second feature density. At least one of the first thickness and the second thickness is between about 0.005 inches and 0.01 inches and at least one of the first feature density and the second feature density is between about two and thirteen heat exchanging features per centimeter.

In another exemplary aspect of the present disclosure, a method of forming a heat exchanger is provided. The method includes additively manufacturing a first passageway housing within an external housing of the heat exchanger, the first passageway housing defining a first fluid passageway. The method further includes additively manufacturing a first plurality of heat exchanging features within the first fluid passageway, each of the first plurality of heat exchanging features defining a first thickness. The method further includes additively manufacturing a second passageway housing within the external housing, the second passageway housing defining a second fluid passageway. The method further includes additively manufacturing a second plurality of heat exchanging features within the second fluid passageway, each the second plurality of heat exchanging features defining a second thickness. At least one of the first thickness and the second thickness is between about 0.005 inches and 0.01 inches.

In still another exemplary aspect of the present disclosure, an additively manufactured heat exchanger is provided. The additively manufactured heat exchanger includes a passageway housing comprising a wall and defining a curvilinear fluid passageway, the fluid passageway extending between an inlet and an outlet and being configured for receiving a flow of fluid. The additively manufactured heat exchanger further includes a plurality of heat exchanging features additively manufactured within the fluid passageway, at least some of the heat exchanging features extending from the wall of the passageway housing at an angle between about twenty and seventy degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
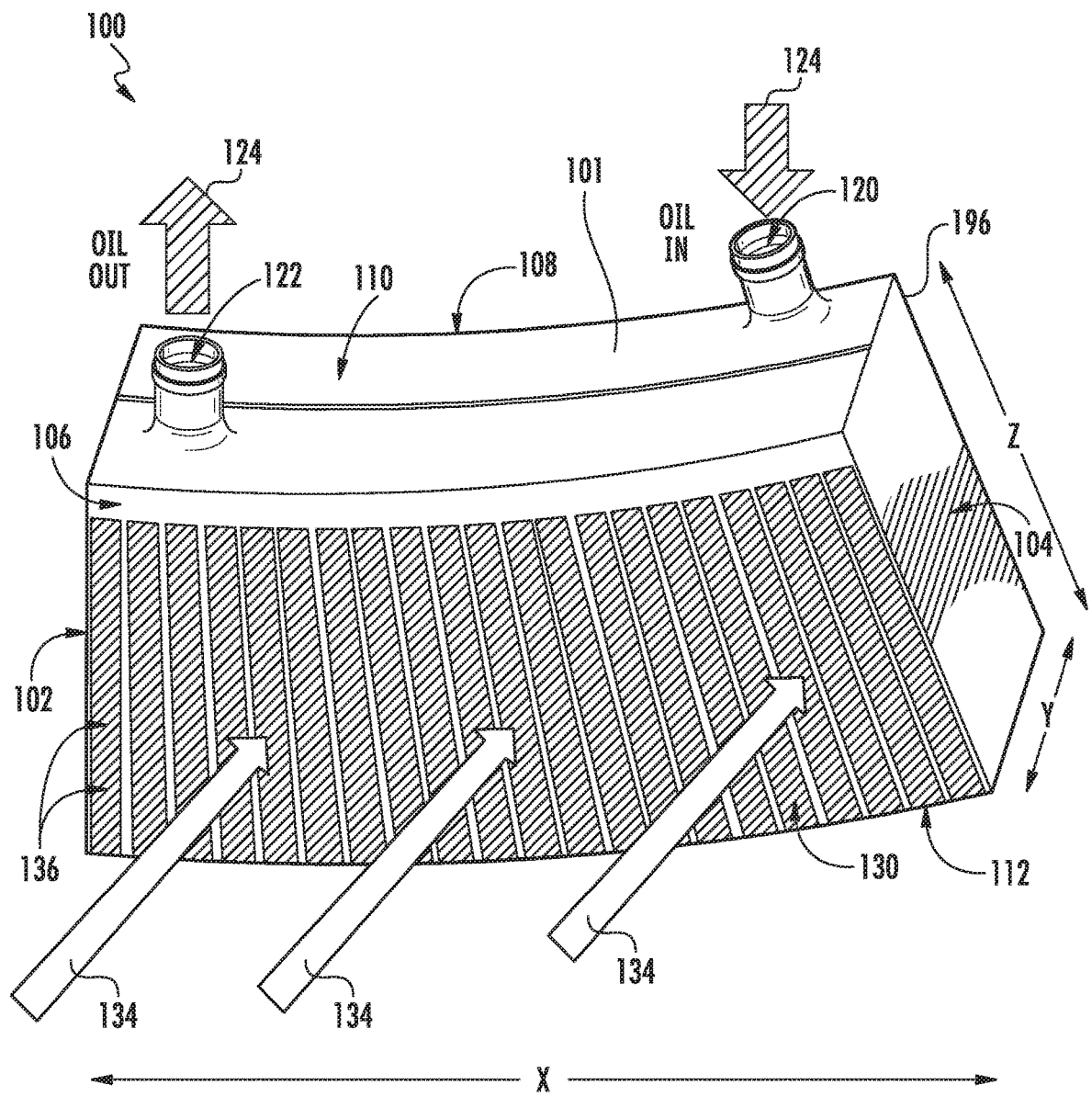
FIG. 1 provides a perspective view of a heat exchanger according to an exemplary embodiment of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, a "fluid" may be a gas or a liquid. The present approach is not limited by the types of fluids that are used. In the preferred application, the cooling fluid is air, and the cooled fluid is oil. The present approach may be used for other types of liquid and gaseous fluids, where the cooled fluid and the cooling fluid are the same fluids or different fluids. Other examples of the cooled fluid and the cooling fluid include fuel, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

A heat exchanger and a method for additively manufacturing the heat exchanger are provided. The heat exchanger includes a plurality of fluid passageways that are formed by additive manufacturing methods which enable the formation of fluid passageways that are smaller in size, that have thinner walls, and that have complex and intricate heat exchanger features that were not possible using prior manufacturing methods. For example, the fluid passageways may be curvilinear and may include heat exchanging fins that are less than 0.01 inches thick and formed at a fin density of more than twelve heat exchanging fins per centimeter. In addition, the heat exchanging fins may be angled with respect to the walls of the fluid passageways and adjacent fins may be offset relative to each other.

Referring to FIG. 1, an additively manufactured heat exchanger 100 will be described according to an exemplary embodiment of the present subject matter. Heat exchanger 100 may be used to transfer heat between two or more fluids in any suitable application. For example, as discussed below, heat exchanger 100 is configured for transferring heat from oil to air in a gas turbine engine. However, it should be appreciated that heat exchanger 100 can be configured for receiving any suitable number and type of fluids for use in the heat transfer process, examples which are described above. In addition, the concepts and heat exchanging structures disclosed herein could be similarly used in automotive, aviation, maritime, and other industries to assist in heat transfer between fluids. Moreover, FIG. 1 illustrates an exemplary block of heat exchanger 100 for the purpose of explaining its general operation, but the size, shape, and configuration of heat exchanger 100 is not intended to limit the scope of the present subject matter. For example, the size, shape, number, and configuration of fluid passageways may be varied while remaining within the scope of the present subject matter.

According to the illustrated embodiment, heat exchanger 100 generally includes an external housing 101 that extends between a left side 102 and a right side 104 along a first direction, e.g., the X-direction. In addition, external housing 101 extends between a front side 106 and a back side 108 along a second direction, e.g., the Y-direction. External housing 101 also extends between a top side 110 and a bottom side 112 along a third direction, e.g., the Z-direction. According to the illustrated embodiment, the X-direction, the Y-direction, and the Z-direction are mutually perpendicular with one another, such that an orthogonal coordinate system is generally defined. However, it should be appreciated that the exemplary heat exchanger 100 and the X-Y-Z coordinate system are used herein only for the purpose of explaining aspects of the present subject matter and are not intended to limit the scope of the present disclosure. In this regard, directional indicators such as "left" and "right," "front" and "back," and "top" and "bottom" are only used to indicate the relative positioning of two sides of heat exchanger along the X-direction, the Y-direction, and the Z-direction, respectively. According to an exemplary embodiment, the walls of external housing 101 may be between about 0.03 inches and 0.1 inches, although any other suitable thickness may be used according to alternative embodiments. However, the parts, features, and construction described herein may be used in heat exchangers having any suitable shape, size, orientation, and configuration defined by any suitable coordinate system.

According to the exemplary illustrated embodiment, an oil inlet 120 and an oil outlet 122 are defined on top side 110 of heat exchanger 100. In this manner, oil (as indicated by arrows 124) enters heat exchanger 100 through oil inlet 120, passes through a plurality of first fluid passageways 126 (FIG. 2), and exits heat exchanger 100 through oil outlet 122, as will be described in detail below. In addition, an air inlet 130 is defined in front side 106 of heat exchanger 100 and an air outlet (not shown) is defined in back side 108 of heat exchanger 100. Therefore, air (as indicated by arrows 134) enters heat exchanger 100 through air inlet 130 and passes through a plurality of second fluid passageways 136, as will be described in detail below. First and second fluid passageways 126, 136 are in thermal communication with each other for transferring heat between the fluids passing therethrough. Notably, however, first fluid passageways 126 and second fluid passageways 136 are separated from each other in that the respective fluids do not physically mix with each other. In this regard, each of first fluid passageways 126 and second fluid passageways 136 may be separated by a plurality of heat exchanger walls.

Figure 2:
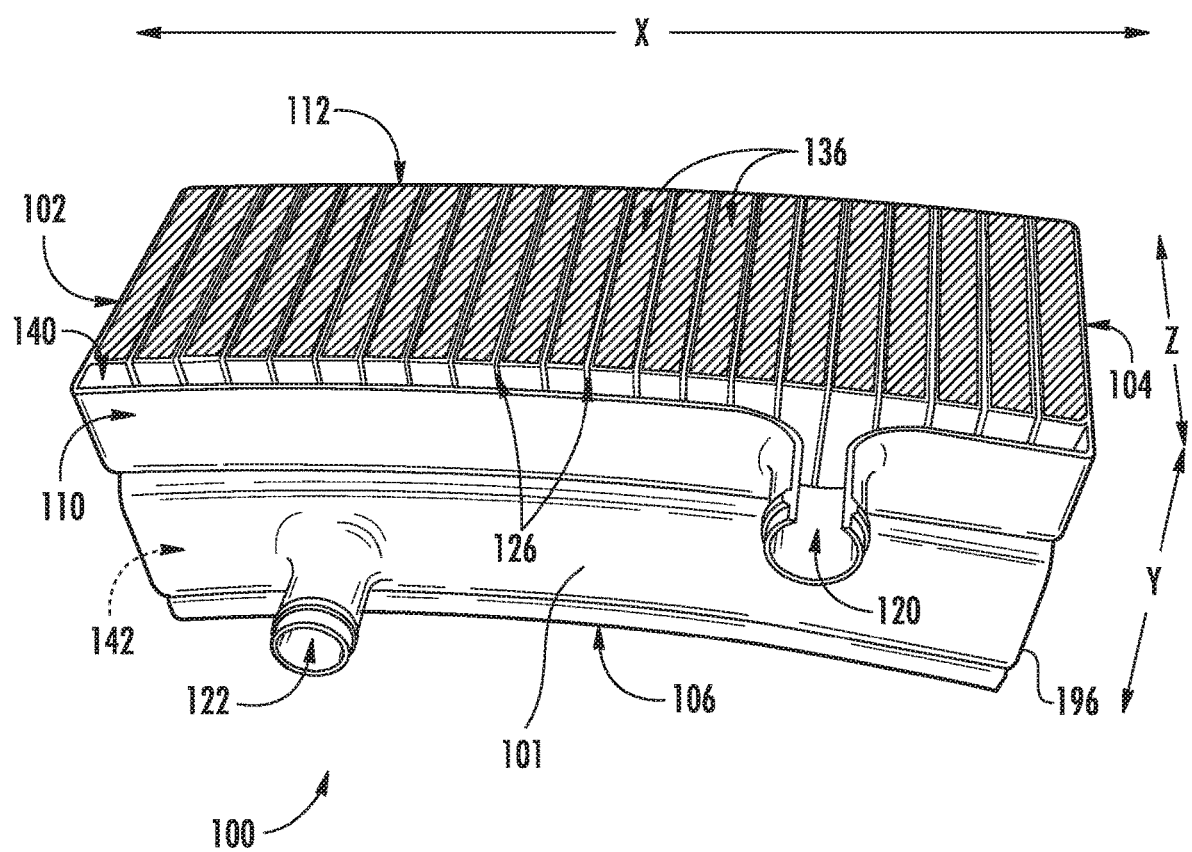
FIG. 2 provides a perspective, cross-sectional view of the exemplary heat exchanger of FIG. 1.
Figure 3:
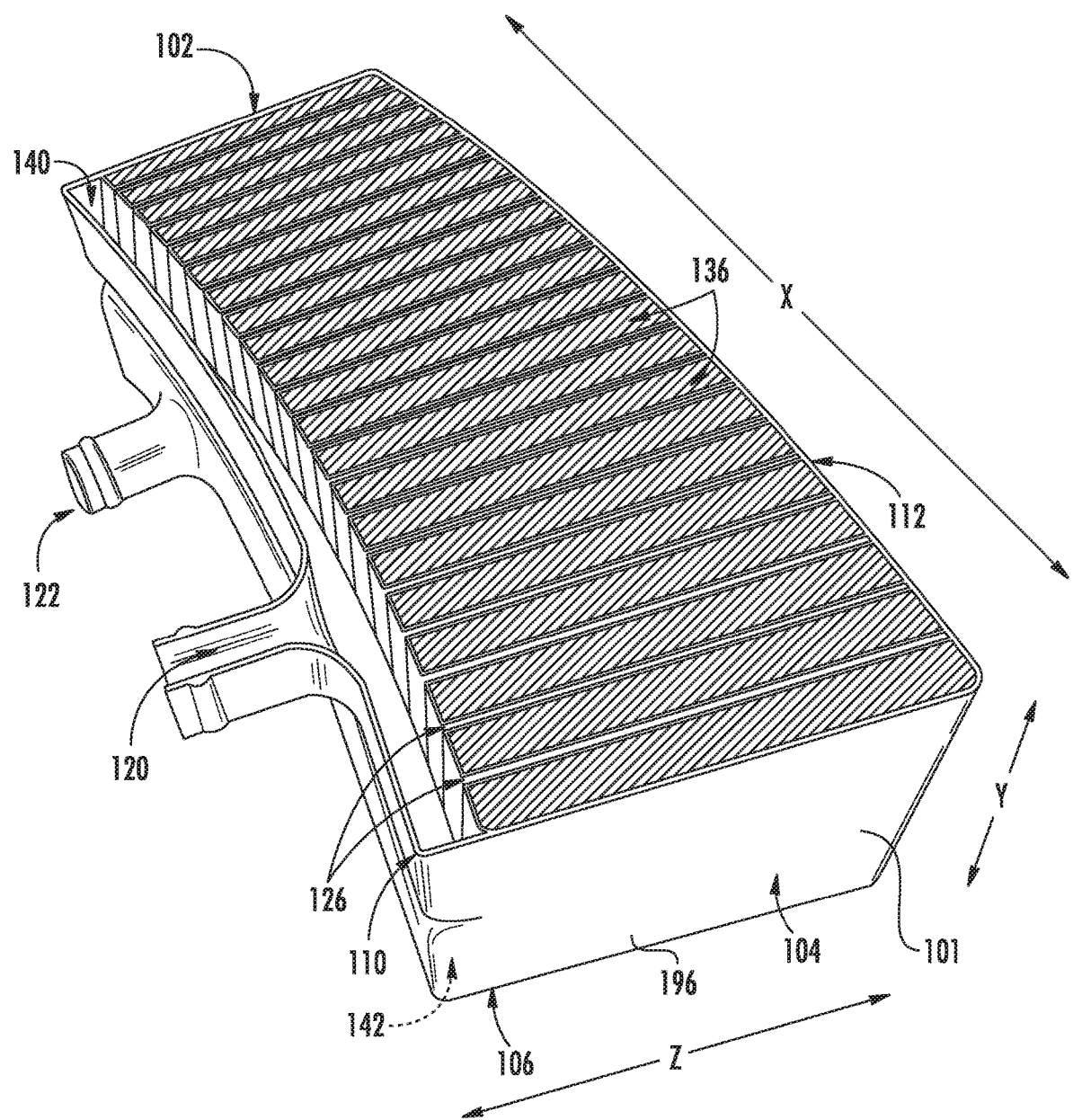
FIG. 3 provides another perspective, cross-sectional view of the exemplary heat exchanger of FIG. 1.

Referring now specifically to FIGS. 2 and 3, heat exchanger 100 defines an inlet plenum 140 and an outlet plenum 142 in direct fluid communication with oil inlet 120 and oil outlet 122, respectively. Inlet plenum 140 is generally configured for allowing oil 124 to diverge from oil inlet 120 and spread out to all of the plurality of first fluid passageways 126. By contrast, outlet plenum 142 is generally configured for allowing oil 124 to converge from all of the plurality of first fluid passageways 126 into oil outlet 122 before exiting heat exchanger 100.

Figure 4:
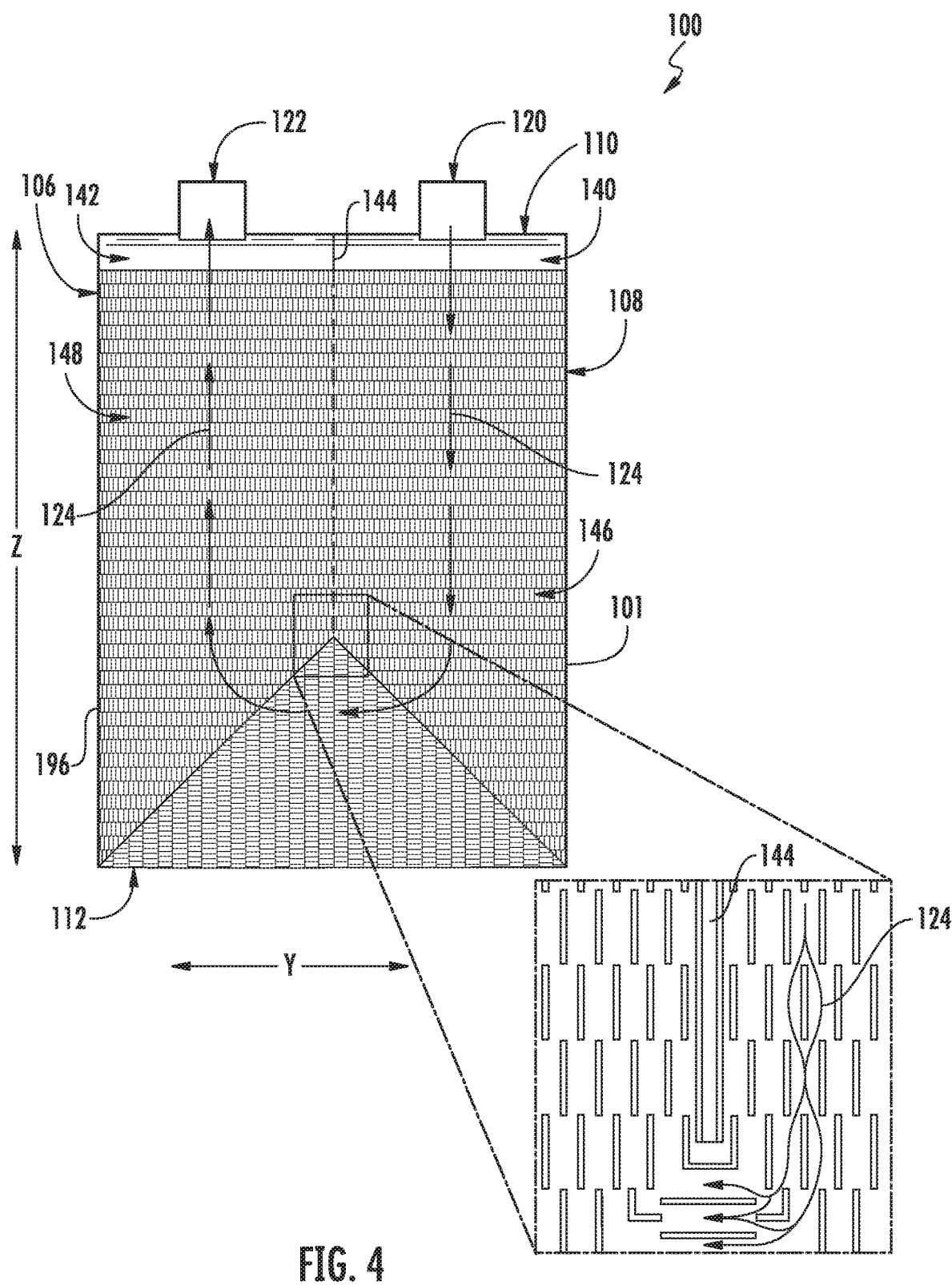
FIG. 4 provides a close-up perspective view of a first fluid passageway of the exemplary heat exchanger of FIG. 1.

Inlet plenum 140 and outlet plenum 142 are separated along the Y-direction by a divider wall 144 such that inlet plenum 140 and outlet plenum 142 are in fluid communication only through the plurality of first fluid passageways 126. Referring now specifically to FIG. 4, divider wall 144 extends from top side 110 along the Z-direction toward bottom side 112 (without reaching bottom side 112) in order to separate the plurality of first fluid passageways 126 and define an inflow segment 146 and an outflow segment 148. In this manner, as oil 124 enters heat exchanger 100 through oil inlet 120 and inlet plenum 140, first fluid passageways 126 generally direct the oil 124 downward along the Z-direction in the inflow segment 146. The oil 124 then passes around divider wall 144 and travels upward along the Z-direction in the outflow segment 148 toward outlet plenum 142. According to the exemplary embodiment, divider wall 144 extends from top side 110 along the Z-direction to a bottom half or a bottom quarter of heat exchanger 100 (i.e., between about fifty and seventy-five percent of a height of heat exchanger 100 along the Z-direction). However, according to alternative embodiments, divider wall 144 may extend any suitable distance from top side 110. Alternatively, each of the plurality of first fluid passageways 126 may be self-contained (e.g., such that the oil does not mix between adjacent passageways) and may be formed into a U-shape.

According to the exemplary embodiment, a single divider wall 144 is illustrated such that first fluid passageways 126 form a U-shape and are configured for directing oil 124 through two passes of heat exchanger 100. More specifically, oil 124 travels substantially along an entire length of heat exchanger 100 downward along the Z-direction in the inflow segment 146 and upward along the Z-direction in the outflow segment 148. In addition, air 134 is illustrated as making a single pass through heat exchanger 100, i.e., from front side 106 to back side 108 substantially along the Y-direction. However, it should be appreciated that heat exchanger 100, and more particularly first and second fluid passageways 126, 136, may be configured for directing their respective fluid through any suitable number of passes to achieve the desired fluid flow and thermal transfer characteristics. In this regard, for example, heat exchanger 100 may include a plurality of divider walls 144 that are configured for directing the oil 124 through four our more passes through heat exchanger 100. Similarly, second fluid passageways 136 may be configured for directing air 134 through multiple passes through heat exchanger 100 to increase heat transfer.

Figure 5:
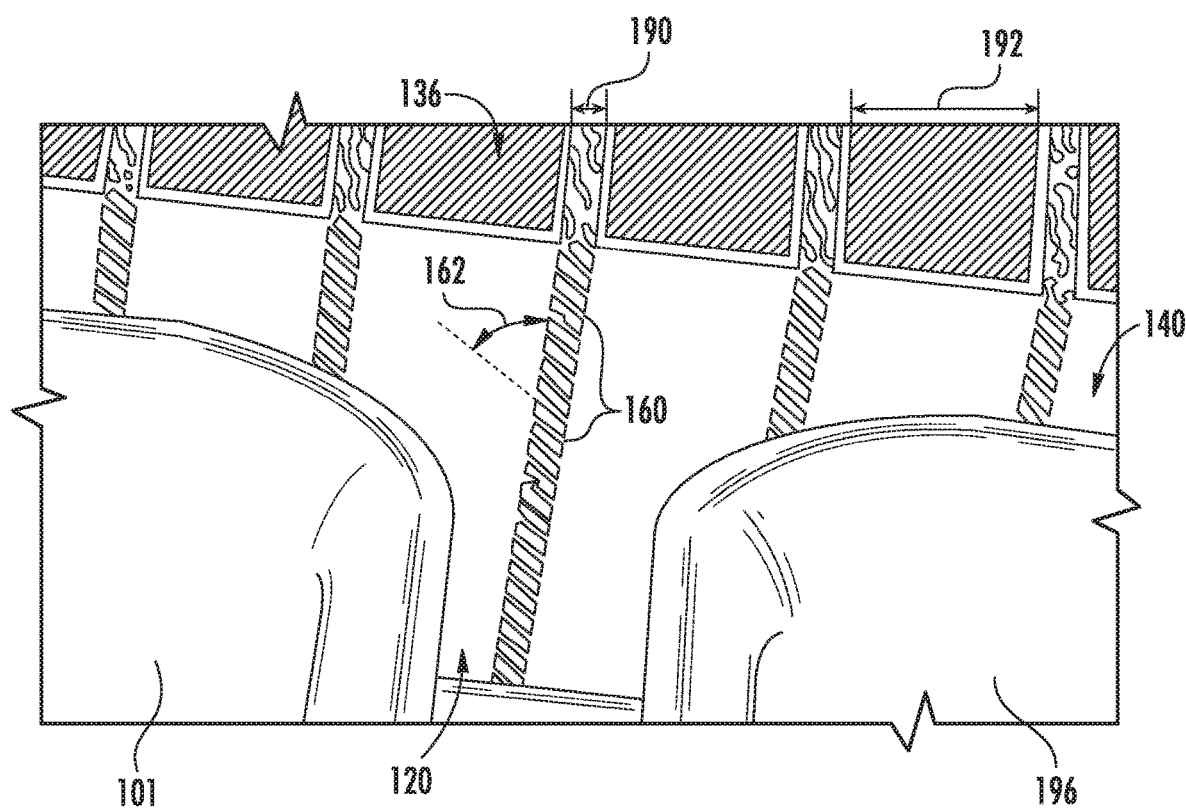
FIG. 5 provides a cross-sectional view of the exemplary heat exchanger of FIG. 1.
Figure 6:
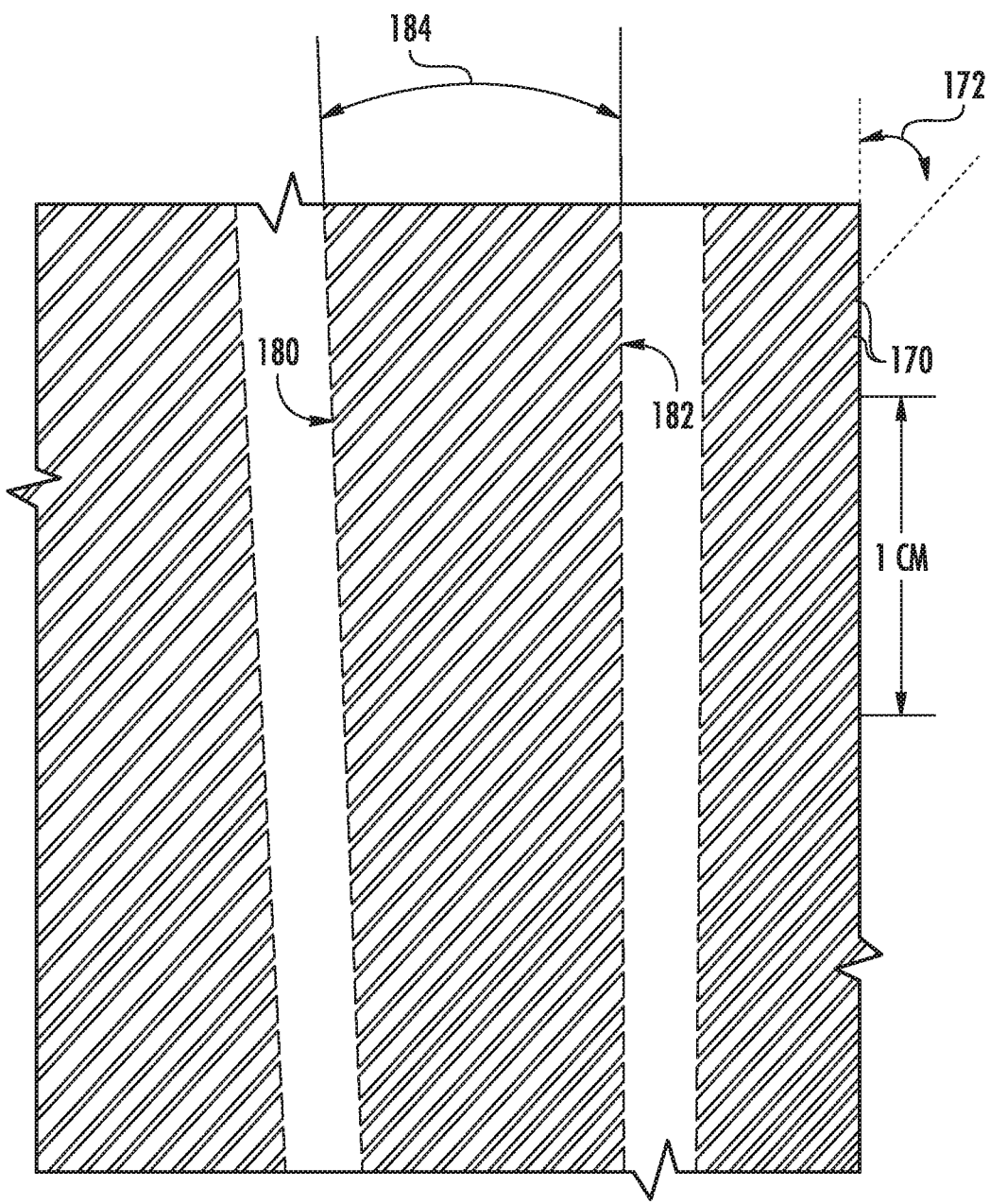
FIG. 6 a close-up, cross-sectional view of a second fluid passageway of the exemplary heat exchanger of FIG. 1.

Notably, the additive manufacturing methods described herein enable the manufacture of fluid passageways and heat exchanging features in configurations, thicknesses, and densities not possible using prior manufacturing methods. The various heat exchanging features in the plurality of first fluid passageways 126 are not illustrated in FIGS. 2 and 3 for clarity. However, referring now to FIGS. 4 through 6, various exemplary fluid passageways 126, 136 and the associated heat exchanging features will be described. More specifically, FIG. 4 provides a side, cross-sectional view of heat exchanger 100 illustrating first fluid passageways 126. FIG. 5 provides a close-up, perspective view of the cross-section illustrated in FIG. 3. FIG. 6 provides a close-up view of the plurality of second fluid passageways 136. It should be appreciated that the additive manufacturing techniques discussed herein may be used to manufacture other fluid passageways, heat exchanging features, and heat exchangers for any suitable purpose.

As illustrated, the plurality of first fluid passageways 126 include a first plurality of heat exchanging features, e.g., illustrated herein as fins 160, for enhancing the transfer of thermal energy. Manufacturing limitations related to conventional heat exchangers require that the fins be oriented substantially perpendicular to the walls of the heat exchange passageway. Notably, however, additive manufacturing methods described below enable fins 160 to be oriented at any suitable angle relative to a wall of the fluid passageway. For example, as illustrated in FIG. 5, fins 160 are oriented at a first angle 162 relative to the walls of the plurality of first fluid passageways 126. For example, first angle 162 may be between about ten and eighty degrees, between about thirty degrees and sixty degrees, or about forty-five degrees according to some embodiments. In this manner, the heat transfer surface of each fin 160 may be increased. It should be appreciated, that as used herein, terms of approximation, such as "approximately," "substantially," or "about," refer to being within a ten percent margin of error.

Referring again to FIG. 4, according to the illustrated exemplary embodiment, fins 160 are staggered to increase fluid contact with fins 160. In this regard, first fluid passageway 126 defines a first fluid flow direction and second fluid passageway 136 defines a second fluid flow direction. As used herein, a fluid passageway with "staggered" heat exchanging features is one where features adjacent to each other along the first or second fluid flow direction are offset from each other along a direction perpendicular to the first or second fluid flow direction. Notably, the magnitude of the offset and the spacing of fins 160 along the first fluid flow direction may vary while remaining within the scope of the present subject matter. In addition, or alternatively, fins 170 may be similarly staggered in second fluid passageways 136.

Referring now specifically to FIG. 6, a close-up view of the plurality of second fluid passageways 136 is illustrated. Similar to the plurality of first fluid passageways 126, the second fluid passageways 136 may include a plurality of heat exchanging surfaces, e.g., fins 170, for enhancing heat transfer. Similar to fins 160, fins 170 may be oriented at any suitable angle relative to a wall of the fluid passageway. For example, as illustrated, fins 170 are oriented at a second angle 172 relative to the walls of the plurality of second fluid passageways 136. For example, second angle 172 may be between about ten and eighty degrees, between about thirty degrees and sixty degrees, or about forty-five degrees according to some embodiments. In this manner, the heat transfer surface of each fin 170 may be increased.

Moreover, each of the plurality of second fluid passageways 136 may be fan-shaped, or may have an increasing width toward bottom side 112 of heat exchanger 100 in order to provide a curved profile to heat exchanger 100. A curved profile may be ideal, for example, to follow the contour of a core engine of a gas turbine engine to which heat exchanger 100 may be mounted. More specifically, each of the plurality of second fluid passageways 136 may be defined in part by a first wall 180 and a second wall 182. According to one exemplary embodiment, first wall 180 and second wall 182 may be plates that have an average thickness of between 0.015 inches and 0.03 inches. A third angle 184 may be defined between first wall 180 and second wall 182. According to the illustrated embodiment, third angle 184 is very small, e.g., less than five degrees. However, it should be noted that the additive manufacturing methods described herein enable the manufacture of heat exchanger 100 such that angle 184 is any suitable angle, such as greater than five degrees, greater than forty degrees, etc.

The additive manufacturing methods disclosed herein also allow for the integral manufacture of very thin fins, such as fins 160 or fins 170. For example, fins 170 may each have a thickness of between about 0.004 inches and 0.2 inches. According to other embodiments, fins 170 may have a thickness between about 0.005 inches and 0.1 inches, or approximately 0.0075 inches. Thus, using the disclosed manufacturing methods, fins 170 may be manufactured at any suitable fin thickness down to a single additively constructed layer, e.g., ten micrometers. Notably, the ability to manufacture extremely thin fins also enables the manufacture of a heat exchanger with very large heat exchanging feature density. For example, fins 170 may be formed to have a fin density between about two and thirteen fins per centimeter. As illustrated in FIG. 6, fins 170 have a fin density of ten fins per centimeter. However, according to alternative embodiments, the fin density of fins 170 may be greater than ten heat exchanging features per centimeter. Moreover, each fin 170 may be identical and evenly spaced throughout each fluid passageway or each fin 170 may be different and spaced in a non-uniform manner.

First fluid passageways 126 and second fluid passageways 136 generally define non-circular geometries, so as to increase the surface area available for thermal exchange. For example, according to the illustrated embodiment, first fluid passageways 126 and second fluid passageways 136 have square or rectangular cross-sections. In this regard, each fluid passageway 126, 136 may have a height that is, for example, an average distance measured perpendicular to the flow of fluid within the passageway. More specifically, for example, the passageway height may be defined as the average distance between the walls of the respective fluid passageway 126, 136, e.g., from one passageway wall to the other along a direction perpendicular to the walls. The additive manufacturing methods described below enable the formation of such fluid passageways 126, 136 at any suitable height.

According to the illustrated exemplary embodiment of FIG. 5, each of first fluid passageways 126 may define a first passageway height 190 and each of second fluid passageways 136 may define a second passageway height 192. First passageway height 190 and second passageway height 192 may also be defined as the distance between first wall 180 and second wall 182 for a given fluid passageway. First passageway height 190 and second passageway height 192 may be uniform along a length of the respective passageway or may vary along a length of the passageway as illustrated in FIG. 6. In addition, each passageway within an array of passageways may have a similar or different height.

First passageway height 190 and second passageway height 192 may be selected to improve the flow of a fluid passing through the respective passageway. For example, a height of a fluid passageway configured for passing oil may be smaller than a height of a fluid passageway configured for passing air. According to an exemplary embodiment, at least one of first passageway height 190 and second passageway height 192 is between about 0.01 inches and 1.0 inches. However, it should be appreciated, that first fluid passageways 126 and second fluid passageways 136 may have any suitable size and geometry.

Each of first fluid passageway 126 and second fluid passageway 136 may be straight, curvilinear, serpentine, helical, sinusoidal, or any other suitable shape. For example, as illustrated in FIG. 4, first fluid passageway 126 is curvilinear, i.e., U-shaped. Notably, heat exchanger 100 may generally include performance-enhancing geometries and heat exchanging features whose practical implementations are facilitated by an additive manufacturing process, as described below. For example, according to some exemplary embodiments, first fluid passageway 126 and second fluid passageway 136 may have a plurality of heat exchanges surfaces or features, e.g., fins 160, 170, to assist with the heat transfer process.

The various portions of heat exchanger 100 may be constructed using any suitable material, in any suitable geometry, density, and thickness, as needed to provide necessary structural support to heat exchanger 100. For example, external walls 196 of heat exchanger 100 may be formed from a rigid, thermally insulating material. In addition, external walls 196 may be thicker and denser to provide structural support for loads experienced by heat exchanger 100 during mounting, assembly, and operation of a gas turbine engine. By contrast, internal walls (e.g., walls 180 and 182 of second fluid passageways 136) may be thinner and constructed of a more thermally conductive material in order to enhance heat transfer. For example, according to an exemplary embodiment, walls of the heat exchange passageways 126, 136 may be constructed of a thermally conductive metal alloy and may be less than 0.03 inches thick. According to still another exemplary embodiment, walls of heat exchange passageways may be about 0.015 inches thick and may vary depending on the what fluid will be passed through the passageway.

According to the illustrated embodiment, first fluid passageways 126 and second fluid passageways 136 are configured in a cross-flow configuration, i.e., the oil and air flow perpendicular to each other. However, it should be appreciated that first fluid passageways 126 and second fluid passageways 136 could alternatively be configured in a counter-flow configuration, where heat exchanger 100 is designed such that the first fluid passageways 126 and second fluid passageways 136 are substantially parallel and the respective fluid streams travel in opposite directions in their respective passageways 126, 136. In addition, according to some embodiments, the fluids may travel in the same direction in their respective passageways 126, 136.

Notably, the additive manufacturing methods described herein enable the formation of heat exchangers having any suitable size or shape. In this regard, for example, the footprints or external profiles of the heat exchangers may be square, circular, curvilinear, or any other suitable shape, e.g., to fit snugly into otherwise "lost space" in a gas turbine engine, or to be more aerodynamic or efficient. In addition, the fluid supply passageways within the heat exchanger may be any suitable size or configuration and may include unique profiles, thinner walls, smaller passageway heights, and more complex and intricate heat exchanging features, some of which are described herein.

Now that the construction and configuration of heat exchanger 100 according to an exemplary embodiment of the present subject matter has been presented, an exemplary method 200 for forming a heat exchanger according to an exemplary embodiment of the present subject matter is provided. Method 200 can be used to form heat exchanger 100, or any other suitable heat exchanger. It should be appreciated that the exemplary method 200 is discussed herein only to describe exemplary aspects of the present subject matter, and is not intended to be limiting.

Figure 7:
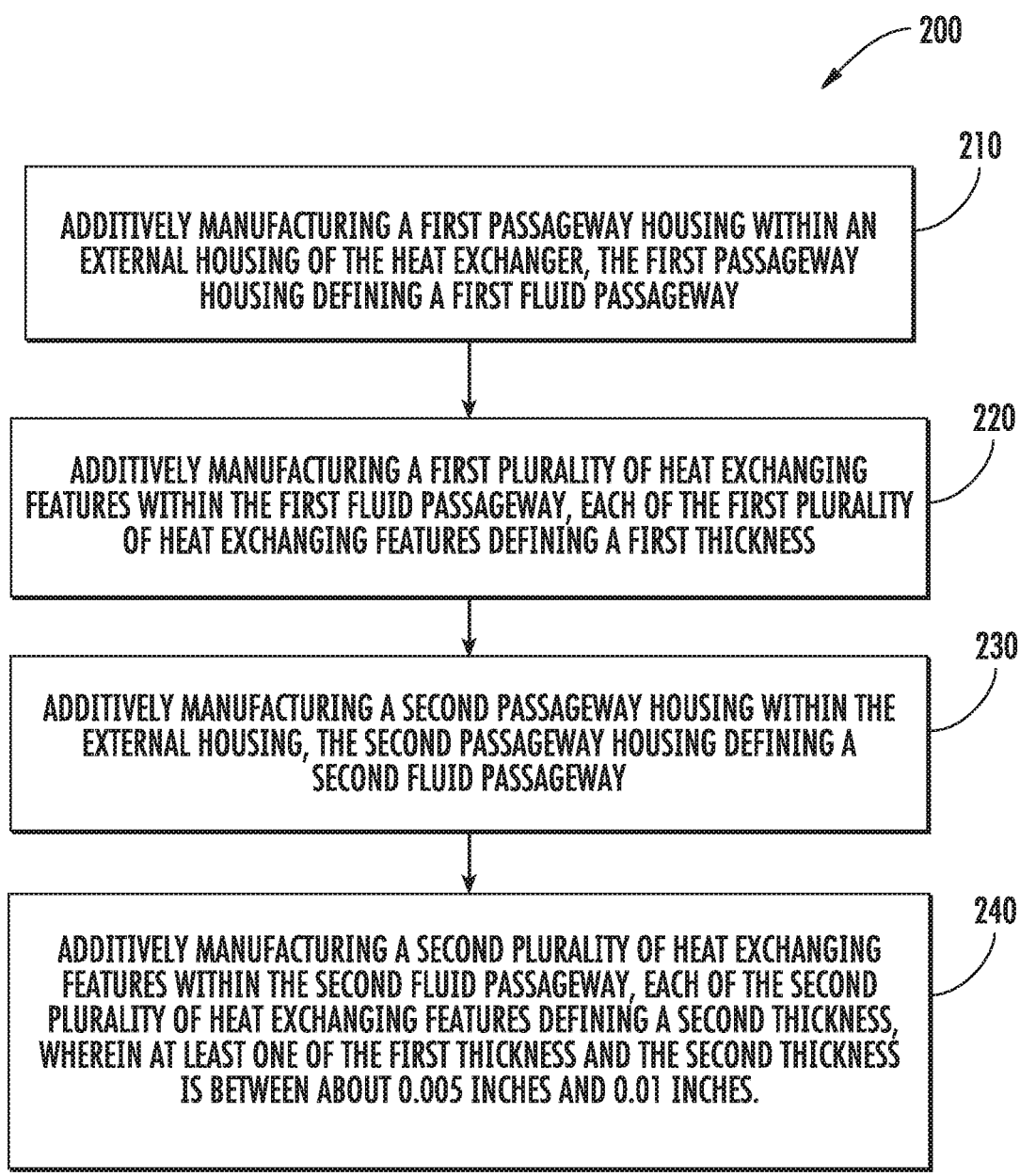
FIG. 7 is a method for forming a heat exchanger according to an exemplary embodiment of the present subject matter.

Referring now to FIG. 7, method 200 includes, at step 210, additively manufacturing a first passageway housing within an external housing of the heat exchanger, the first passageway housing defining a first fluid passageway. Step 220 includes additively manufacturing a first plurality of heat exchanging features within the first fluid passageway, each of the first plurality of heat exchanging features defining a first thickness. Step 230 includes additively manufacturing a second passageway housing within the external housing, the second passageway housing defining a second fluid passageway. Step 240 includes additively manufacturing a second plurality of heat exchanging features within the second fluid passageway, each the second plurality of heat exchanging features defining a second thickness. Notably, according to an exemplary embodiment at least one of the first thickness and the second thickness is between about 0.005 inches and 0.01 inches.

In general, the disclosed heat exchanger 100 may be manufactured or formed using any suitable process. However, in accordance with several aspects of the present subject matter, heat exchanger 100 may be formed using an additive-manufacturing process, such as a 3-D printing process. The use of such a process may allow heat exchanger 100 to be formed integrally, as a single monolithic component, as described above according to an exemplary embodiment. In particular, the manufacturing process may allow heat exchanger 100 to be integrally formed and include a variety of features not possible when using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up", layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Metal Laser Sintering (DMLS), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, heat exchanger 100 may be formed in part, in whole, or in some combination of materials including but not limited to pure metals, nickel alloys, chrome alloys, titanium, titanium alloys, magnesium, magnesium alloys, aluminum, aluminum alloys, and austenite alloys such as nickel-chromium-based superalloys (e.g., those available under the name Inconel® available from Special Metals Corporation).

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting process. One skilled in the art will appreciate other methods of fusing materials to make a component by additive manufacturing are possible, and the presently disclosed subject matter may be practiced with those methods.

In addition, the additive manufacturing process disclosed herein allows a single component to be formed from multiple materials. Thus, heat exchanger 100 may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although heat exchanger 100 is described above as being constructed entirely by additive manufacturing processes, it should be appreciated that in alternate embodiments, all or a portion of heat exchanger 100 may be formed via casting, machining, and/or any other suitable manufacturing process. Indeed, any suitable combination of materials and manufacturing methods may be used to form heat exchanger 100.

An exemplary additive manufacturing process will now be described. Additive manufacturing processes fabricate components using three-dimensional (3D) information, for example a three-dimensional computer model, of the component. Accordingly, a three-dimensional design model of heat exchanger 100 may be defined prior to manufacturing. In this regard, a model or prototype of heat exchanger 100 may be scanned to determine the three-dimensional information of heat exchanger 100. As another example, a model of heat exchanger 100 may be constructed using a suitable computer aided design (CAD) program to define the three-dimensional design model of heat exchanger 100.

The design model may include 3D numeric coordinates of the entire configuration of the component including both external and internal surfaces of heat exchanger 100. For example, the design model may define the external housing, the heat exchanging structure, internal fluid channels or circulation conduits, openings, support structures, etc. In one exemplary embodiment, the three-dimensional design model is converted into a plurality of slices or segments, e.g., along a central (e.g., vertical) axis of the component or any other suitable axis. Each slice may define a two-dimensional (2D) cross section of the component for a predetermined height of the slice. The plurality of successive 2D cross-sectional slices together form the 3D component. The component is then "built-up" slice-by-slice, or layer-by-layer, until finished.

In this manner, heat exchanger 100 is fabricated using the additive process, or more specifically each layer is successively formed, e.g., by fusing or polymerizing a plastic using laser energy or heat or by sintering metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the heat exchanging surfaces (e.g., walls 136) may be as thin as one thickness of an associated powder layer, e.g., 10 µm, utilized during the additive formation process.

Notably, in exemplary embodiments, several features of heat exchanger 100 were previously not possible due to manufacturing restraints. However, the present inventors have advantageously utilized current advances in additive manufacturing techniques to develop exemplary embodiments of heat exchanger 100 generally in accordance with the present disclosure. While the present disclosure is not limited to the use of additive manufacturing to form heat exchanger 100 generally, additive manufacturing does provide a variety of manufacturing advantages, including ease of manufacturing, reduced cost, greater accuracy, etc.

In this regard, utilizing additive manufacturing methods, heat exchanger 100 may be a single piece of continuous metal, and may thus include fewer components and/or joints than known heat exchangers. The integral formation of heat exchanger 100 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of heat exchanger 100. For example, heat exchanger 100 may include thin walls (less than 0.03 inches), narrow passageways, and novel heat exchanging features. All of these features may be relatively complex and intricate for maximizing heat transfer and minimizing the size or footprint of heat exchanger 100. In addition, the additive manufacturing process enables the manufacture of structures having different materials, specific heat transfer coefficients, or desired surface textures, e.g., that enhance or restrict fluid flow through a passageway. The successive, additive nature of the manufacturing process enables the construction of these passages and features. As a result, heat exchanger 100 performance may be improved relative to other heat exchangers.

Utilizing an additive process, the surface finish and passageway size may be formed to improve fluid flow through the passageways, to improve heat transfer within the passageways, etc. For example, the surface finish may be adjusted (e.g., made smoother or rougher) by selecting appropriate laser parameters during the additive process. A rougher finish may be achieved by increasing laser scan speed or a thickness of the powder layer, and a smoother finish may be achieved by decreasing laser scan speed or the thickness of the powder layer. The scanning pattern and/or laser power can also be changed to change the surface finish in a selected area. Notably, a smoother surface may promote a faster flow of fluid through a heat exchanger passageway, while a rougher surface may promote turbulent flow of fluid and increased heat transfer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger defining a mutually orthogonal X-direction, Y-direction, and Z-direction, the heat exchanger comprising:
    an external housing extending between a front side and a back side along the Y-direction and extending between a top side and a bottom side along the Z-direction, the external housing defining a fluid inlet and a fluid outlet spaced apart along the Y-direction;
    a divider wall extending from the top side of the external housing toward the bottom side, the divider wall stopping short of the bottom side to define an inflow segment, an outflow segment, and a transition segment that fluidly couples the inflow segment to the outflow segment within the external housing; and
    a plurality of walls positioned within the external housing to define a plurality of first fluid passageways providing fluid communication between the fluid inlet and the fluid outlet for receiving a flow of first fluid, the plurality of first fluid passageways extending through each of the inflow segment, the outflow segment, and the transition segment, and wherein the plurality of walls further defining a plurality of second fluid passageways extending along the Y-direction for receiving a flow of second fluid in thermal communication with the flow of first fluid.

2. The heat exchanger of claim 1, wherein the external housing defines an inlet plenum in fluid communication with the fluid inlet for distributing the flow of first fluid to the plurality of first fluid passageways and an outlet plenum in fluid communication with the fluid outlet for merging the flow of first fluid from the plurality of first fluid passageways.

3. The heat exchanger of claim 1, wherein the divider wall separates the inlet plenum from the outlet plenum along the Y-direction.

4. The heat exchanger of claim 1, wherein the inflow segment and the outflow segment are fluidly coupled proximate the bottom side such that the plurality of first fluid passageways form a U-shape.

5. The heat exchanger of claim 1, wherein the flow of first fluid is oil and the flow of second fluid is air.

6. The heat exchanger of claim 1, wherein at least one of the plurality of first fluid passageways is curvilinear.

7. The heat exchanger of claim 1, wherein the plurality of first fluid passageways defines a first passageway height, and the plurality of second fluid passageways defines a second passageway height,
    wherein at least one of the first passageway height and the second passageway height is between about 0.05 inches and 0.5 inches.

8. The heat exchanger of claim 7, wherein at least one of the first passageway height and the second passageway height is less than 0.1 inches.

9. The heat exchanger of claim 1, further comprising:
    a first plurality of heat exchanging features positioned within the plurality of first fluid passageways, each of the first plurality of heat exchanging features defining a first thickness and a first feature density; and a second plurality of heat exchanging features positioned within the plurality of second fluid passageways, each the second plurality of heat exchanging features defining a second thickness and a second feature density, wherein at least one of the first thickness and the second thickness is between about 0.005 inches and 0.01 inches and at least one of the first feature density and the second feature density is between about two and thirteen heat exchanging features per centimeter.

10. The heat exchanger of claim 9, wherein at least one of the first thickness and the second thickness is about 0.0075 inches.

11. The heat exchanger of claim 9, wherein at least one of the first feature density and the second feature density is greater than ten heat exchanging features per centimeter.

12. The heat exchanger of claim 9, wherein the plurality of walls comprise a first wall and a second wall, the first plurality of heat exchanging features being oriented at a first angle relative to the first wall and the second plurality of heat exchanging features being oriented at a second angle relative to the second wall, and wherein an absolute value of at least one of the first angle and the second angle is less than ninety degrees.

13. The heat exchanger of claim 12, wherein the absolute value of at least one of the first angle and the second angle is about forty-five degrees.

14. The heat exchanger of claim 9, wherein the plurality of first fluid passageways defines a first fluid flow direction and the plurality of second fluid passageways defines a second fluid flow direction, wherein at least one of the first plurality of heat exchanging features and the second plurality of heat exchanging features is staggered along the first fluid flow direction or along the second fluid flow direction, respectively.

15. The heat exchanger of claim 1, wherein the plurality of first fluid passageways and the plurality of second fluid passageways are configured for cross-flow, counter-flow, cross-counter flow, or parallel-flow of two or more fluids.

16. The heat exchanger of claim 1, wherein the plurality of first fluid passageways and the plurality of second fluid passageways are configured for receiving air, fuel, coolant, or oil.

17. A method of forming a heat exchanger, the heat exchanger defining a mutually orthogonal X-direction, Y-direction, and Z-direction, comprising:

additively manufacturing an external housing extending between a front side and a back side along the Y-direction and extending between a top side and a bottom side along the Z-direction, the external housing defining a fluid inlet and a fluid outlet spaced apart along the Y-direction;

additively manufacturing a divider wall extending from the top side of the external housing toward the bottom side, the divider wall stopping short of the bottom side to define an inflow segment, an outflow segment, and a transition segment that fluidly couples the inflow segment to the outflow segment within the external housing; and additively manufacturing a plurality of walls positioned within the external housing to define a plurality of first fluid passageways providing fluid communication between the fluid inlet and the fluid outlet for receiving a flow of first fluid, the plurality of first fluid passageways extending through each of the inflow segment, the outflow segment, and the transition segment, and wherein the plurality of walls further defining a plurality of second fluid passageways extending along the Y-direction for receiving a flow of second fluid in thermal communication with the flow of first fluid.

18. The method of claim 17, wherein the external housing defines an inlet plenum in fluid communication with the fluid inlet for distributing the flow of first fluid to the plurality of first fluid passageways and an outlet plenum in fluid communication with the fluid outlet for merging the flow of first fluid from the plurality of first fluid passageways.

19. The method of claim 17, wherein the divider wall separates the inlet plenum from the outlet plenum along the Y-direction.

20. The method of claim 17, wherein the inflow segment and the outflow segment are fluidly coupled proximate the bottom side such that the plurality of first fluid passageways form a U-shape.

* * * * *